(12) United States Patent
Tischenborf

(10) Patent No.: US 7,413,434 B2
(45) Date of Patent: Aug. 19, 2008

(54) METHOD FOR THE PRODUCTION OF RAW MATERIALS FOR CANDLE PRODUCTION AND A HEAT STORE MATERIAL

(76) Inventor: Dieter Tischenborf, Battensteinstrasse 15, Hilders (DE) D-36115

( * ) Notice: Subject to any disclaimer, the term of this patent is extended or adjusted under 35 U.S.C. 154(b) by 129 days.

(21) Appl. No.: 10/565,361

(22) PCT Filed: Jul. 23, 2004

(86) PCT No.: PCT/EP2004/008269

§ 371 (c)(1),
(2), (4) Date: Jan. 23, 2006

(87) PCT Pub. No.: WO2005/010135

PCT Pub. Date: Feb. 3, 2005

(65) Prior Publication Data

US 2006/0211875 A1    Sep. 21, 2006

(30) Foreign Application Priority Data

Jul. 24, 2003    (DE)    ................................ 103 33 862

(51) Int. Cl.
*F23D 3/16* (2006.01)
*C11C 5/00* (2006.01)
*C11B 3/00* (2006.01)
(52) U.S. Cl. .......................... 431/288; 44/275; 554/174
(58) Field of Classification Search ................... 44/275; 431/288; 554/174; 585/9
See application file for complete search history.

(56) References Cited

U.S. PATENT DOCUMENTS

| | | | | |
|---|---|---|---|---|
| 3,844,706 A | * | 10/1974 | Tsaras | ........................ 431/288 |
| 4,278,609 A | * | 7/1981 | Kuiper | ........................ 554/145 |
| 5,928,696 A | * | 7/1999 | Best et al. | .................... 426/417 |
| 6,645,261 B2 | * | 11/2003 | Murphy et al. | ................. 44/275 |

FOREIGN PATENT DOCUMENTS

| | | | |
|---|---|---|---|
| EP | 1228701 A1 | | 8/2002 |
| JP | 64-67580 | | 3/1989 |
| JP | 1067580 | * | 3/1989 |
| JP | 06-269639 | | 9/1994 |
| WO | WO 96/05278 | | 2/1996 |
| WO | WO 03/012016 | | 2/2003 |

OTHER PUBLICATIONS

Wikipedia Article "Kerze", http://de.wikipedia.org/wiki/Kerze.
Wikipedia Article "Kerze", http://de.wikipedia.org/wiki/Kerze (English Translation).
Excerpt of Russian document entitled "All About Nutrition From A Chemist Point of View", I. M. Skurichin, A.P. Netschaev, 1991, with German and English translations.

* cited by examiner

*Primary Examiner*—Yvonne Eyler
*Assistant Examiner*—Yate K Cutliff
(74) *Attorney, Agent, or Firm*—Charles P. Boukus, Jr.

(57) ABSTRACT

The invention pertains to a method for the production of raw materials for candle production and for heat storage material, such as waxes, in which from a starting material containing lipids, the lipids are extracted and/or refined and/or hydrogenated. As the starting material, a mixture of organic materials containing lipids, in particular mixtures of food residues, old cooking fats and/or recycled food materials from the food industry, and/or animal fats are washed and comminuted, in a first method step; in a second method step, the lipids are isolated; and next, the lipids are selectively esterified and/or refined and/or hydrogenated into the raw material for the candle production or for the heat storage material.

23 Claims, No Drawings

METHOD FOR THE PRODUCTION OF RAW MATERIALS FOR CANDLE PRODUCTION AND A HEAT STORE MATERIAL

The invention relates to a method for producing raw materials for candle production and a heat storage material, such as waxes, in which from a starting material containing lipids, the lipids are extracted and/or refined and/or hydrogenated.

PRIOR ART

As raw materials for candle production, paraffin or beeswax is primarily employed at present. For long-burning candles and oil lamps, solid and hardened vegetable fats or fish oils are also used. To improve the processability to achieve glossy effects and the like, microscopic waxes or hard vegetable waxes such as candelilla-carnauba or Japan wax can be mixed in.

These substances are solely mineral or solely vegetable fats and/or oils, each obtained separately from a different starting material.

The mineral oils and fats that can be used as raw material in candle production occur in the processing of petroleum, an example being the petroleum derivative paraffin. Because of the limited incidence of petroleum and the improved processing techniques of the petroleum-processing industry, petroleum derivatives that can be employed for candle production occur less and less in petroleum processing. As a consequence, such petroleum products become more expensive, and hence there is a concentration of these petroleum derivatives in products that occupy a higher rank, in the estimation of the user, than a candle.

Animal fats are as a rule produced from slaughterhouse trimmings, which are heated in boilers to 120° C. without significant addition of water. However, the odor and taste of cracklings and fat is greatly influenced by thermal protein breakdown, which leads to fats of lesser quality. In the wet melting method, the animal starting materials are first mechanically comminuted, then heated with direct steam to 90° C., and the tallow is melted out. The practically fat-free cracklings are separated, using decanting centrifuges, from the glue solution, from which the fat is settled out by cooling.

About 80% of the entire world production of vegetable and animal fats and oils is used for nutrition. About 20%—as a rule those fats and oil not suited for human use—are supplied to industrial uses and thus serve as raw material for the chemical industry.

In vegetable fats and oils, depending on their origin, a distinction is made between seed fats (such as palm kernel oil) and fruit flesh fats (such as palm oil). The fats and oils are obtained by expelling and/or extraction, using organic solvents or water.

Vegetable and animal fats and oils are triglycerides of medium or unsaturated fatty acids.

Until now, it has been definitive for the production of candles that if fish oils and vegetable oils and fats are used as raw materials, they are obtained separately and optionally mixed together later in the production process of the candles. To achieve the necessary purity and consistency as a raw material for candle production, these fats and oils are refined and/or hydrogenated.

In the preparation of foods both commercially and at home, large quantities of food oils and fats of vegetable origin are used, especially for sauteing and deep-frying. The proportion of these fats that goes unused must be disposed of or recycled as a residue. In gastronomy and the food industry, the potential amount of sauteing and deep-frying fats that can be collected in Germany is estimated to be between 150,000 and 280,000 t per year. Until now, these old cooking fats have for the most part been used in so-called feed oils in the mixed feed industry. The illegal disposal of motor or transformer oil in old cooking fats, which led to the dioxin scandal in Belgium, illustrates the necessity of removing old cooking oils and fats from feed production, since such contaminants can also reach the human food chain through animal feed.

Animal fats and oils that occur as byproducts of slaughter have also for the most part been used in the mixed feed industry. Because of various animal diseases, such as BSE, it is both desirable and necessary that such problematic materials be kept out of the human food chain.

To achieve this, these products are used in the chemical industry for lubricants, and increasingly also for energy production in heating and electrical power systems, biogas systems, and biodiesel systems.

Object

It is therefore the object of the invention to make a method available for producing raw materials for candle production and heat storage material, such as waxes, in which as the starting material, a mixture of organic materials containing lipids, in particular mixtures of food residues, old cooking fats, recycled food residues from the food industry, and organic household leftovers and/or animal fats are to be used.

Attainment of the Object

This object is attained by a method having the characteristics of the preamble to claim 1, in which as the starting material, a mixture of organic materials containing lipids, in particular mixtures of food residues, old cooking fats and/or recycled food materials from the food industry, and/or animal fats, are washed and comminuted, in a first method step; in a second method step, the lipids are isolated; and finally, the lipids are selectively esterified and/or refined and/or hydrogenated into the raw material for the candle production or for the heat storage material.

As a result, it becomes possible to extract the lipids from a mixture of organic starting materials without having to consider their origin, since by the method of the invention the lipids are extracted from all organic materials. Thus not only organic materials containing lipids of both purely vegetable origin and purely animal origin, but also mixtures of them, can be extracted by the method of the invention. After processing the lipids, it is almost impossible to tell which lipid is of animal and which is of vegetable origin. Nor does it matter, in the method of the invention, what proportion of animal or vegetable organic materials containing lipids the mixture should have. On the contrary, all mixture ratios are possible, from 0% to 100% of individual components.

In a first advantageous feature of the invention, before the second method step, the mixture is made into a slurry. This assures good thorough mixing of the starting material and creates an essentially homogeneous composition.

Advantageously, between the first and second method steps, in a further method step the starting material is dehydrogenated and sterilized at an overpressure of $10^5$ Pa to $5 \times 10^5$ Pa, preferably $3 \times 10^5$ Pa, and at a temperature of between 353 K and 453 K, preferably 403 K. This results in denaturing of the proteins and the elimination of bacteria and viruses along the lines of a standard sterilization process.

According to the invention, it is provided that the raw material for the candle production and for the heat storage material be harvested by centrifuging, filtration, fragmentation, or solvent elution.

It is also provided that the lipids thus obtained are delivered to the refinement and/or hydrogenation in liquid form, preferably at a temperature of from 333 K to 353 K, in particular 343 K. During the refinement, esterification and/or a further re-esterification of the fatty acids to lipids can be done, which can be followed by chemical and/or physical refinement.

The esterification and re-esterification can be done by heating old fats with a correspondingly high acid number, by the addition of glycerin, which in terms of its acid number is readily in excess, and a mineral acid. By careful washing with a soda solution or dilute caustic soda, an acid number <1 can be attained.

During the refinement, desliming can selectively be done. This is followed by neutralization, washing, and drying. Finally, the refinement is concluded by bleaching, filtration, and/or deodorizing of the product.

In the context of the refinement, depending on the quality of the starting material, a further desliming and/or neutralization can also be done.

In the ensuing hydrogenation, the desired product properties are obtained by the addition of hydrogen, using catalysts; for various iodine numbers, different further processing options are contemplated.

The hydrogenation that follows the refinement can be done at a pressure of $1\times10^5$ Pa to $50\times10^5$ Pa, and in particular $3\times10^5$ Pa to $5\times10^5$ Pa. To speed up the hydrogenation of the lipids, catalysts are used, in particular nickel or a noble metal, such as platinum.

If the raw material produced by the method of the invention is to be further processed by casting for the candle production, then the hydrogenation is done up to an iodine number of $\leq 60$. However, raw materials with this iodine number are suitable not only for casting but also for paste filling. However, if the raw material is to be further processed by the compacting method, then the lipids are hydrogenated to an iodine number of $\leq 20$.

In a further advantageous concept of the invention, it is provided that a mixture of organic materials containing lipids of vegetable and animal origin is used as the starting material.

It can be recommended that mineral oils and fats also be added to the mixture of organic material containing lipids; they are likewise processed by the method of the invention into the desired raw materials for the candle production, or for heat storage material.

The same is true for hydrocarbons, which are added to the mixture of organic materials containing lipids.

In a further advantageous concept of the invention, it is provided that the various lipids within the mixture of the starting material, as well as the mineral oils and fats or the hydrocarbons added, are processed into triglycerides. The triglycerides are especially well suited to use as a raw material for candle production or for the heat storage material.

To obtain an especially uniform, homogeneous raw material for candle production or for the heat storage material, it has proved advantageous to process the lipids within the mixture of the starting material, as well as the added mineral oils and/or fats, or the added hydrocarbons, into a uniform triglyceride.

It is especially advantageous if before the isolation of the lipids, the free fatty acids are extracted from the mixture of starting materials, or from the added substances. To that end, the acid number is optionally determined and the free, non-esterified fatty acids contained are neutralized, for instance with the use of sodium hydroxide.

Before the raw materials obtained by the method of the invention are further processed, dyes and/or fragrances can also be added to them. The criteria as to which fragrances and/or dyes are added and in what quantity depends on the further processing of the raw materials.

The raw materials thus obtained may be used, in among other ways, for candle production by known casting, compacting or drawing methods, or for paste filling methods or foaming methods.

Further objects, advantages, characteristics, and possibilities of use of the present invention will become apparent from the ensuing description of the exemplary embodiments. All the characteristics described, on their own or in arbitrary useful combination, form the subject of the present invention, even independently of how they are summarized in the claims and of the dependencies of the claims.

Exemplary Embodiment

Food residues and organic byproducts are collected, washed, made into a slurry in water, and comminuted to a size of 2 to 3 mm. The starting material thus obtained is separated in a reprocessing system. Solids and extraneous substances are thus removed. Next, the dehydrogenation and sterilization of the material is done at 403 K at an overpressure of $3\times10^5$ Pa and with an action time of 20 minutes, in order to denature and eliminate bacteria, viruses, and proteins. From the sterilized composition that then exists, the lipid fraction is drained off and cooled down.

The liquid lipid fraction is delivered to refinement at a temperature of approximately 343 K; depending on the acid number, an esterification is performed first, to reduce the quantity of waste products. This esterification can be repeated multiple times in a circulatory system.

This is followed by the actual refinement. Acid and lye treatments are done multiple times at different pressures, temperatures, and dwell times. The acid and lye treatments are interrupted by washing operations. Next, a phase of deodorizing follows at high temperatures and with a long dwell time, so that a phase of bleaching can ensue.

The liquid composition thus obtained is delivered to a hydrogenation process, in which changes in the carbon chain occur at a pressure of $1\times10^5$ Pa to $50\times10^5$ Pa and at a temperature of 453 K to 553 K and with a correspondingly long dwell time, using a suitable catalyst, such as platinum or nickel. Ideally, hydrogenation is done up to an iodine number of $\leq 20$ for the further processing by the compacting method. For the casting method or paste filling, hydrogenation up to iodine numbers of $\leq 80$ is suitable.

Next, the liquid product is fed at approximately 343 K through a heated line, although still other temperatures in the range from 317 K to 355 K may also be possible, into a heated collecting basin. There, dyes and fragrances are added to the mixture. Other pure fats, oils and paraffins can now be mixed in as well, to lend the product the desired properties.

The hot composition is delivered from the collecting basin to a crystallizer, which by application of a major temperature difference causes cooling down of the composition. This results in a coarse—and fine-crystalline powder, which can be delivered via a vacuum line at a variable underpressure to various presses, hydraulic extruders, or eccentric presses. There, by compacting pressure and deformation, the composition is processed into candles, optionally with the application of temperature.

To obtain a desired finish, work can be done with heated tools, so that deburring operations can also be avoided. This compacting method has proved to be an efficient form of processing.

Carrying the liquid raw material onward can also be done in various casting systems to be operated manually or industrially, in which by means of molds being filled with the liquid composition, the desired shape of candle is obtained by controlled chilling. The quantity of inflowing product can be regulated by means of a sensor. The cooling process can be speeded up by applying cold via refrigeration systems or fans.

To avoid unwanted deformation or shrinkage, it is provided that a second casting process follows. It too be automated in filling stations or can also be done manually.

The raw material or the raw material mixture may, however, be precooled in a crystallizer to such an extent that a pastelike state is reached. In this pastelike form, the raw material can be filled into a desired shaping vessel, optionally with the application of pressure.

The invention claimed is:

1. A method for the production of raw materials for candle production and for heat storage material, in which from a starting material comprising a mixture of food residues, old cooking fats and/or recycled food materials from the food industry, and/or animal fats and further containing lipids, the lipids are extracted and/or refined and/or hydrogenated, comprising the steps of:
   a) washing and comminuting the starting material;
   b) dehydrogenating and sterilizing the washed and comminuted starting material;
   c) isolating and processing the lipids into triglycerides; and
   d) refining and hydrogenating the triglycerides into the raw material for the candle production or for the heat storage material.

2. The method in accordance with claim 1, characterized in that before the step of isolating and processing the lipids into triglycerides, the mixture is made into a slurry.

3. The method in accordance with claim 1, characterized in that the starting material is dehydrogenated and sterilized at an overpressure of $10^5$ Pa to $5 \times 10^5$ Pa and at a temperature of 353° K to 453° K.

4. The method in accordance with claim 1, characterized in that the raw material for the candle production or the heat storage material is obtained by one of the following method steps:
   a) centrifuging;
   b) filtration;
   c) fragmentation;
   d) solvent elution.

5. The method in accordance with claim 1, characterized in that the triglycerides are delivered to the refinement and/or hydrogenation in liquid form at a temperature of from 333° K to 353° K.

6. The method in accordance with claim 1, characterized in that the triglycerides are selectively esterified and/or re-esterified in a circulatory process, one or more times.

7. The method in accordance with claim 1, characterized in that the refinement includes at least one of the following method steps:
   a) desliming (soap decomposition)
   b) neutralization (deacidification and desalting)
   c) washing
   d) drying
   e) bleaching and rebleaching
   f) filtration
   g) deodorizing.

8. The method in accordance with claim 1, characterized in that the triglycerides are pressure-hydrogenated.

9. The method in accordance with claim 7, characterized in that the triglycerides are hydrogenated using a catalyst.

10. The method in accordance with claim 9, characterized in that as the catalyst, nickel or a noble metal is used.

11. The method in accordance with claim 1, characterized in that the triglycerides are hydrogenated up to an iodine number$\leq$80.

12. The method in accordance with claim 1, characterized in that the triglycerides are hydrogenated up to an iodine number$\leq$20.

13. The method in accordance with claim 1, characterized in that as the starting material, a mixture of organic materials containing lipids of vegetable and animal origin is used.

14. The method in accordance with claim 13, characterized in that mineral oils and fats are added to the mixture of organic materials containing lipids.

15. The method in accordance with claim 13, characterized in that hydrocarbons are added to the mixture of organic materials containing lipids.

16. The method in accordance with claim 1, characterized the lipids within the mixture of the starting material are processed into a uniform triglyceride.

17. The method in accordance with claim 1, characterized in that the lipids are isolated, free fatty acids are extracted from the mixture.

18. The method in accordance with claim 1, characterized in that dyes and/or fragrances are added to the raw materials obtained.

19. The method in accordance with claim 1, characterized in that from the raw materials obtained, candles are produced by casting, compacting or drawing, or by paste filling methods or foaming methods.

20. A raw material for candle production and heat storage material, produced by a method in accordance with claim 1 comprising triglycerides being hydrogenated up to an iodine number$\leq$20.

21. A candle, made from a raw material which is produced by a method in accordance with claim 1 comprising triglycerides being hydrogenated up to an iodine number$\leq$20.

22. The method in accordance with claim 1, characterized in that the starting material is dehydrogenated and sterilized at an overpressure of about $3 \times 10^5$ Pa and at a temperature of about 403° K.

23. The method in accordance with claim 1, characterized in that the triglycerides are delivered to the refinement and/or hydrogenation in liquid form at a temperature of about 343° K.

* * * * *